United States Patent [19]

Akens

[11] 4,281,777
[45] Aug. 4, 1981

[54] DUAL LIQUID PROPORTIONING APPARATUS

[76] Inventor: Robert L. Akens, 3201 Boggs Rd., Zanesville, Ohio 43701

[21] Appl. No.: 894,039

[22] Filed: Apr. 6, 1978

[51] Int. Cl.³ .................................................. B67D 5/60
[52] U.S. Cl. ................................... 222/134; 222/309; 222/334
[58] Field of Search ............... 222/134, 135, 136, 137, 222/145, 309, 334

[56] References Cited

U.S. PATENT DOCUMENTS

| | | | |
|---|---|---|---|
| 1,917,678 | 7/1933 | Wheeler | 222/309 X |
| 3,151,778 | 10/1964 | Olney et al. | 222/134 |
| 3,158,998 | 12/1964 | Robinson et al. | 222/134 X |
| 3,474,965 | 10/1969 | Coleman | 222/134 X |
| 3,710,982 | 1/1973 | Ferrari | 222/134 |
| 3,901,408 | 8/1975 | Boden et al. | 222/309 X |

*Primary Examiner*—Joseph J. Rolla
*Attorney, Agent, or Firm*—Francis T. Kremblas, Jr.

[57] ABSTRACT

A multiple fluid proportioning and dispensing apparatus particularly well suited to dispense two fluids to be mixed together in predetermined ratios and capable of handling highly abrasive substances. The apparatus is characterized by the arrangement of two variable volume chambers operatively connected to the respective fluid sources and to respective piston and cylinder arrangements. At least one of the piston and cylinder arrangements include a piston stroke length adjustment sleeve to permit varying the delivered volume of one fluid relative to the other to and include control valve arrangements to automatically dispense the mixture of the predetermined proportions in an efficient manner.

6 Claims, 3 Drawing Figures

DUAL LIQUID PROPORTIONING APPARATUS

BACKGROUND

Apparatus which proportion, mix and dispense liquids or solids suspended in liquids have long presented a problem to industries which require the use of such mixtures which are abrasive or otherwise present difficulties in handling. Further apparatus of this type employing pumps and the like are relatively expensive and many times are less than satisfactory relative to the accuracy desired.

For example, a graphite suspension mixed with a large proportion of water is useful in conditioning tools and dies in the forging industry. Such a suspension, however, is very abrasive when in conventional pumps or cylinder piston arrangements. Breakdowns are so common as to make such apparatus very unsatisfactory.

Further, prior dispensing and proportioning apparatus for large scale industrial applications did not possess the desired level of accuracy without incurring a disproportionate cost and then reliability was not always as consistent as desired particularly with difficulty to handle liquids.

Therefore a long felt need has existed for a relatively simple and inexpensive liquid proportioning device which has the capability to handle highly abrasive substances in a highly accurate and reliable manner.

SUMMARY OF THE INVENTION

The present invention relates generally to liquid proportioning and dispensing apparatus and particularly to such an apparatus in which a novel construction provides a high degree of accuracy, a capability to handle a wide variety of liquids including heretofore very difficult substances, and a relatively simple and inexpensive design possessing long life, reliability and easy maintenance.

The apparatus of the present invention is characterized by a relatively simple cylinder-piston arrangement connected to variable volume chambers which receive the respective liquid from a source of supply. The liquids are dispensed from each chamber in a predetermined ratio by means of adjusting the length of the piston stroke acting on one of the chambers while preferably maintaining the other piston stroke constant. In this manner a highly accurate volume of each liquid is delivered from each chamber to a common storage tank which is adapted to dispense the desired mixture on demand and automatically activate the apparatus to replenish the supply of the desired mixture.

OBJECTS

It is therefore a primary object of the present invention to provide a proportioning and dispensing apparatus which automatically dispenses two liquids in predetermined proportion in a simple, efficient manner.

It is another object of the present invention to provide an apparatus of the type described wherein one liquid is dispensed in a constant volume and the other in any predetermined proportional volume with a high degree of accuracy and reliability.

It is another object of the present invention to provide an apparatus of the type described wherein accurate proportions of two liquids may be delivered and mixed utilizing a novel piston cylinder arrangement in conjunction with a variable volume chamber which permits the use of liquids or solids in suspension to be handled which are highly abrasive or other-wise present difficulties in conventional prior art apparatus.

It is still another object of the present invention to provide an apparatus of the type described which incorporates a relatively inexpensive construction which also lends itself to a compact design to save valuable floor industrial space.

It is a further object of the present invention to provide an apparatus of the type described which is capable of dispensing on demand a quantity of the predetermined mixture and automatically provide for replenishing the supply of the proportioned mixture by activating the action of the cylinder and piston arrangement.

Further objects and advantages of the present invention will be apparent from the following description, reference being had to the accompanying drawings wherein preferred forms of embodiments of the invention are clearly shown.

IN THE DRAWINGS

FIG. 1 is a side elevational view in section through the centerline of the apparatus of a preferred embodiment of a proportioning and dispensing apparatus constructed in accordance with the present invention and including a general diagrammatic representation of the fluid circuit between the power source, supply sources and mixture accumulator;

FIG. 2 is a side elevational view in section through the centerline of the apparatus of another embodiment of the present invention illustrating diagrammatically the fluid circuit similar to the view shown in FIG. 1; and FIG. 3 is a diagrammatic view showing in detail a typical fluid circuit arrangement employed in accordance with the present invention to proportion, mix and dispense two fluids in a predetermined manner.

DETAILED DESCRIPTION

Figure 1:
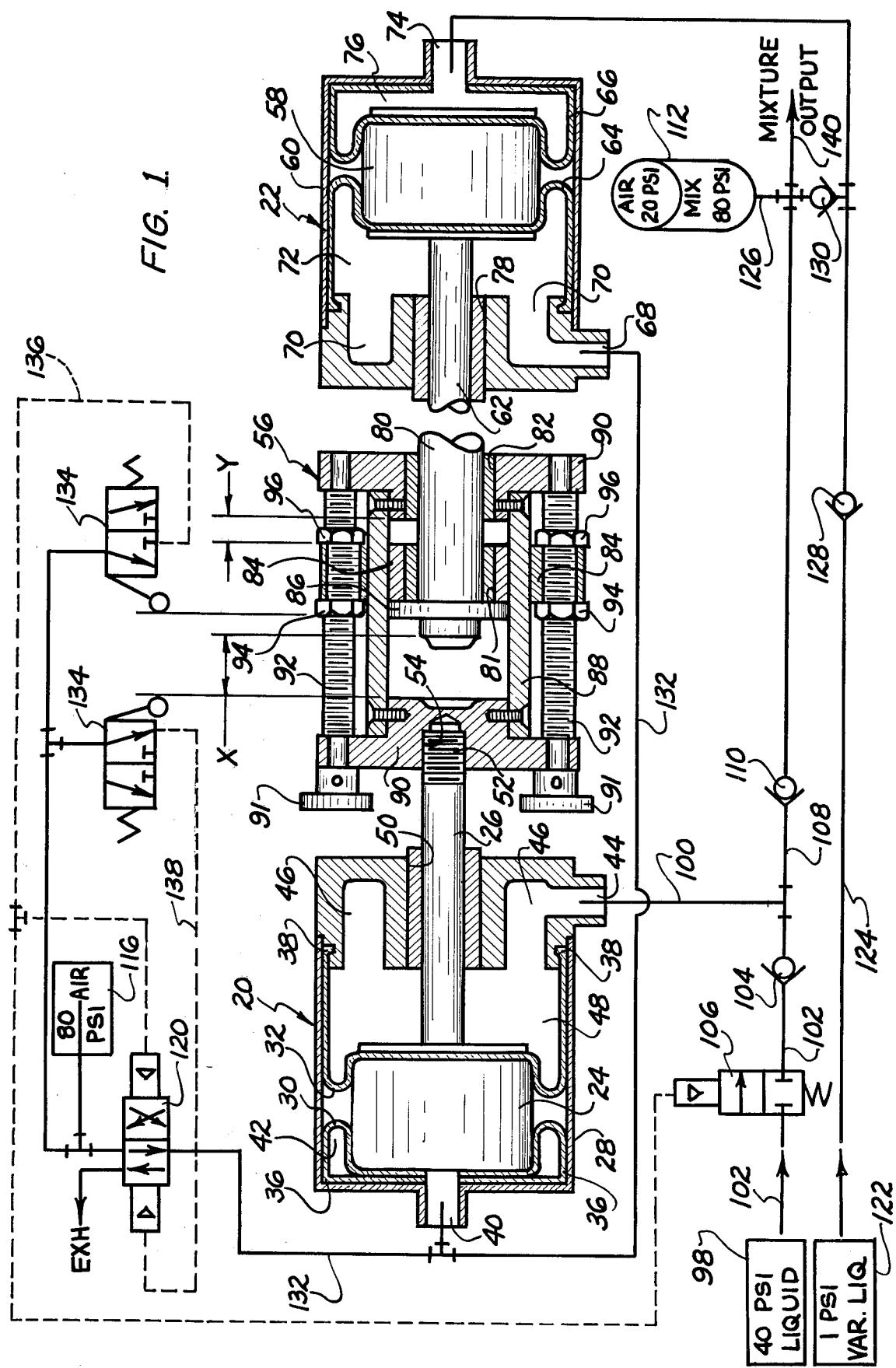

An apparatus for proportioning and dispensing two fluids in a predetermined manner constructed in accordance with the present invention is illustrated in FIG. 1 and includes a pair of piston and cylinders indicated generally at 20 and 22 which are conventionally mounted on a suitable base or frame, not shown.

Cylinder-piston arrangement 20 includes a piston 24 mounted on rod 26 for reciprocal movement extending the length of a fixed cylinder 28.

Variable volume chambers 42 and 48 are provided on each side of piston head 24 via a pair of rolling diaphrams 30 and 32 which are fixed at their open ends in sealed relationship to the end walls of cylinder 28, such as 36 and 38, and at their central inner portions to opposing ends of piston head 24.

A port 40 provided in cylinder 28 communicates with variable volume chamber 42 and a port 44 communicates with annular passage 46 which in turn communicates with variable volume chamber 48.

Rod 26 is slideably mounted in sealed relationship in a bore 50 in one end of cylinder 28 and is fixedly secured via threaded end 52 in a threaded bore 54 provided in a piston stroke adjustment means indicated generally at 56.

Piston-cylinder arrangement 22 is identically constructed in so far as piston 58, cylinder 60, rod 62 and rolling diaphrams 64 and 66 are concerned. Cylinder 60 includes an air pressure port 68 communicating with annular passage 70 which, in turn, communicates with a variable volume chamber 72. Also provided is a liquid entry and exit port 74 which communicates with variable volume chamber 76.

Piston rod 62 is slideably mounted in sealed relationship in bore 78 and extends inwardly to an enlarged end portion 80 which is slideably mounted through a bore 82 provided in piston stroke adjustments means 56 and terminates upon extending through adjustment sleeve 84.

An annular collar 86 is provided on end portion 80 to stabilize movement of rod 62 relative to the frame 88 of adjustment means 56 and abuts against sleeve 84.

Referring specifically to adjustment means 56, the frame portion 88 includes flanged end portions 90 which are provided with threaded rods 92 extended through one end portion and resting against the opposite end portion. Knobs 91 are provided on the left end of each rod 92.

Adjustment sleeve 84 is slideably mounted on end portion 80 through bushing 81 and is slideably mounted along the length of threaded rods 92 between respective spaced nuts 94 and 96.

The position of nuts 94 and 96 along the length of rods 92 which position can be changed by rotating each knob 91 which rotate rods 92 causing nuts 94 and 96 to move left or right dependent upon the direction of rotation of knobs 91.

As each pair of nuts 94 and 96 are caused to move along the threaded length of rods 92, sleeve 84 follows accordingly.

Therefore, the positioning of sleeve 84 in this manner varies the effective stroke length of piston 58 by creating a gap between the inner end of end portion 90 and the left hand end of rod portion 80. The dimension of that gap, shown as dimension X in FIG. 1, varies according to the position of sleeve 84. The full stroke of the piston rod is predetermined by a pair of limit pneumatic switches and a pair of spaced outwardly extending levers, not shown, which can be mounted on frame 88 to mechanically actuate the limit switches to control the length of the power stroke of the piston.

The general fluid circuit will be described next with the view that a detailed circuit will be described later with reference to FIG. 3.

Port 44 is communicated to the unit liquid supply tank 98 via conduits 100 and 102 through an appropriate check valve 104 and a control valve 106.

Preferably unit liquid supply 98 is pressurized but at a level significantly below the level of the driving force of the pistons. It has been found that pressurized air at 80 psi with the unit liquid at 40 psi works quite well for most applications in the present invention.

For purposes of the present invention, the term liquid as used herein includes solids suspended in a liquid.

Port 44 is also communicated via conduit 108 and check valve 110 to a common storage mix tank or accumulator 112.

Control valve 106 is connected to pressurized air source 116 via line 118 and a control valve 120.

The variable liquid supply 122 is communicated to variable volume chamber 76 via line 124. Check valves 128 and 130 provide for the appropriate direction of flow between source 122 and chamber 76 relative to accumulator 112.

Port 40 communicates variable volume chamber 42 to air source 116 through control valve 120 and line 132 which also communicates variable volume chamber 72 via port 68 and annular passage 70 to air source 116.

A pair of pneumatic valves 134 are provided and are communicated to side ports in control valve 120 via line 136 and 138 and control the proper switching of pressurized air to activate the pistons for each power stroke. A pair of levers, not shown, are mounted to frame 88 and incorporated to strike a mechanical switch on respective valves 134 to conventionally activate the valves to perform the limit switch function.

From the foregoing description it should be apparent that while piston 24 always experiences a full stroke upon pressurization, piston 58 experiences a stroke between 0 and a full stroke dependent upon the positioning of adjustment sleeve 84. For example, as illustrated in FIG. 1, piston 24 has a full stroke equal to the dimension x plus y, while piston 58 experiences a stroke equal to the dimension y. Therefore, when the net areas of the pistons are equal, the ratio between the unit liquid in chamber 24 and the variable liquid in chamber 76 is proportional to the fraction y divided by the sum of the dimensions x plus y.

Therefore any proportional mixture between one to one and 100 percent of the unit liquid may be accurately delivered to accumulator 112 and dispensed therefrom as determined by a simple adjustment of the sleeve 84.

Since accumulator 112 is precharged and the mixture is charged at 80 psi, appropriate control valving makes it relatively simple to permit the discharge of the desired mixture for use via outlet valve 140 to also function to activate the system to cause the pistons 24 and 58 to recharge the accumulator. Therefore, dispensing of the pressurized mixture automatically activates the proportioning mechanisms to maintain an adequate supply of the desired mixture.

It should also be noted that the adjusting means 56, incorporating the adjustment block 84, provides a simple but highly accurate manner to adjust the stroke length of piston 58 in order to vary in an almost infinite manner the ratio of the liquid volumes to be mixed.

It is highly desirable to maintain the stroke length of piston 24 constant since this provides a sound base to determine and maintain the accuracy and reliability of the liquid proportions.

Figure 2:
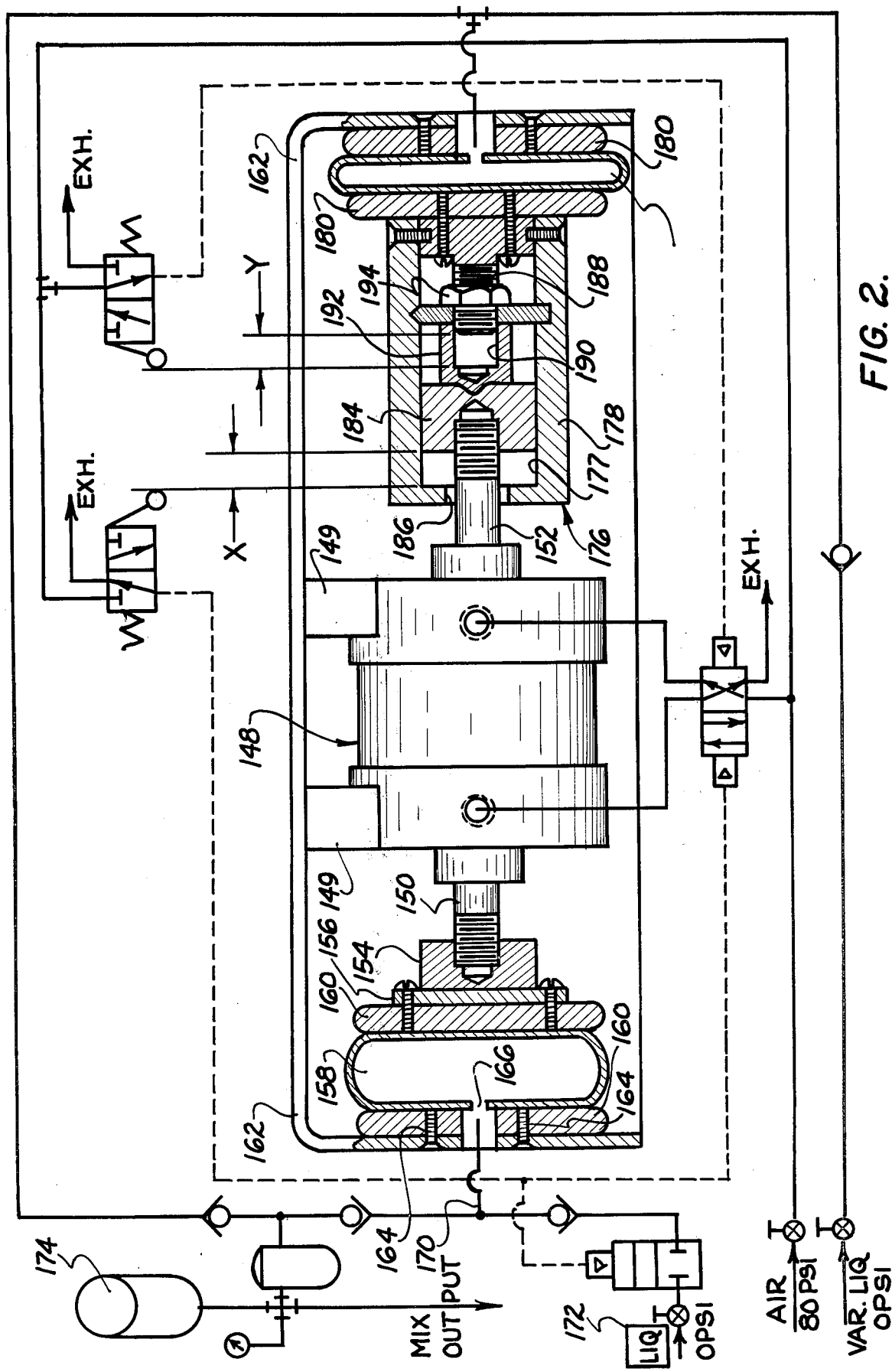

Now referring to FIG. 2, another embodiment of the present invention is illustrated which differs primarily in the use of a double acting air driven cylinder and piston arrangement to provide power to dispense each liquid from a variable volume chamber in controlled proportions.

As shown in FIG. 2, a conventional double acting air cylinder, indicated generally at 148, is fixed to base 162 via bolted flanges 149 and includes piston rods 150 and 152.

Rod 150 is threadably fastened to a block 154 carrying a fixed flat face plate 156.

A variable volume chamber in the form of a rubber diaphram 158 is provided with a pair of opposing aluminum end plates 160 fixed to the diaphram and is fixedly positioned to overall frame or stand 162, such as by threaded fasteners at 164, for example. Plate 160 on the right hand end, as viewed in FIG. 2, is fixed to face plate 156 carried by piston rod 150, in any conventional manner, such as bolts for example. Chamber 158 preferably is in the form of a resilient member such as a rubber diaphram or bellows. It has been found that conventional diaphrams primarily used as air springs work quite well and are rather easily altered and adapted for use in the present invention.

Chamber 158 is provided with a port 166 which communicates with a drilled passage 168 in end plate 160 which in turn is connected to conduit 170 which leads to both the liquid supply 172 and also to the accumulator 174 for storage of the desired mixture.

The other piston rod 152 of the double acting cylinder is connected to a piston stroke adjustment means indicated generally at 176.

Adjustment means 176 includes frame means 178 that is fixedly mounted to the right hand end of an end plate 180 which is affixed to variable volume chamber 182 which also comprises a resilient diaphram that is provided with an opposing fixed end plate 180 which is fixed to base 162 in the same manner as described for chamber 158.

Frame means 178 includes an elongated slot or opening 177 which slideably receives a block 184 which is threadably fixed to the inner end of piston rod 152, which in turn, is slideably mounted through an appropriate hole 186 provided in the inner end of frame means 178.

Frame means 178 also includes a generally centrally disposed threaded post 188 which is received in a threaded bore 190 provided in an adjustable sleeve 192.

An adjustment nut 194 mounted on post 188 permits one to position the post 188 in the bore 190 to effect the relative position of the sleeve 192 in slot 177 within the frame means 178.

It should be readily appreciated that the positioning of the sleeve 192 in this fashion increases or decreases the effective stroke length of rod 152 relative to the movement of the frame means 178 against resilient chamber 182.

Therefore by simply adjusting the position of threaded post 188 within threaded bore 190, the resulting movement of sleeve 192 by block 184 mounted on rod 152 results in varying the dimensions x and y as shown in FIG. 2.

If sleeve 192 is moved sufficiently to the left to reduce dimension x to 0, chamber 182 will be effected by the full piston stroke and maximum volume of liquid will be delivered from chamber 182.

By appropriate dimensioning of the bore 190 and post 188, the minimum value of dimension y may be controlled such that the maximum value of the dimension x, which preferably represents the full stroke of the piston rod 152 is not sufficient to permit block 184 to force frame 178 attached to end plate 180 against chamber 182, and no liquid will be expelled therefrom.

It should be readily appreciated from the foregoing description that the volume of liquid delivered from chamber 182 is therefore easily controlled by manipulation of adjustment sleeve 192 as described to deliver a volume of liquid from chamber 182 anywhere between the maximum value and zero.

Piston rod 150 has preferably a full stroke length equal to the stroke of rod 152 and the net areas of each chamber are equal. Therefore with equal driving force applied to both pistons, the ratio of the liquid delivered from chamber 158 to the liquid delivered from chamber 182 may be accurately controlled and varied between an equal ratio of each to 100% of the liquid in chamber 158.

Still referring to FIG. 2, a diagrammatic view of a typical fluid circuit is also shown which generally illustrates the conventional value control means, liquid supply vessels, a source of pressurized air, and the mixing tank and accumulator which stores the desired mixture for ultimate use as utilized in the embodiment of FIG. 2.

Since the basic difference between the connection and valving procedures between the embodiment shown in FIG. 2 with that described in FIG. 1, is primarily based upon the use of a double acting air cylinder instead of the dual cylinder and piston arrangement, a detailed description will be omitted here in the interest of economy.

The fluid circuit comprises standard components and in a general manner is conventional, except as applied to the present invention. The resulting ratio of liquids delivered to the accumulator 174, which is also precharged, and the valve control means and switching means which permit actuation of the power stroke of the cylinder upon a demand signal from a pressure monitor connected to the accumulator is the same in principle. Therefore it is not believed necessary to repeat in detail all the circuit functions relative to FIG. 2.

Figure 3:
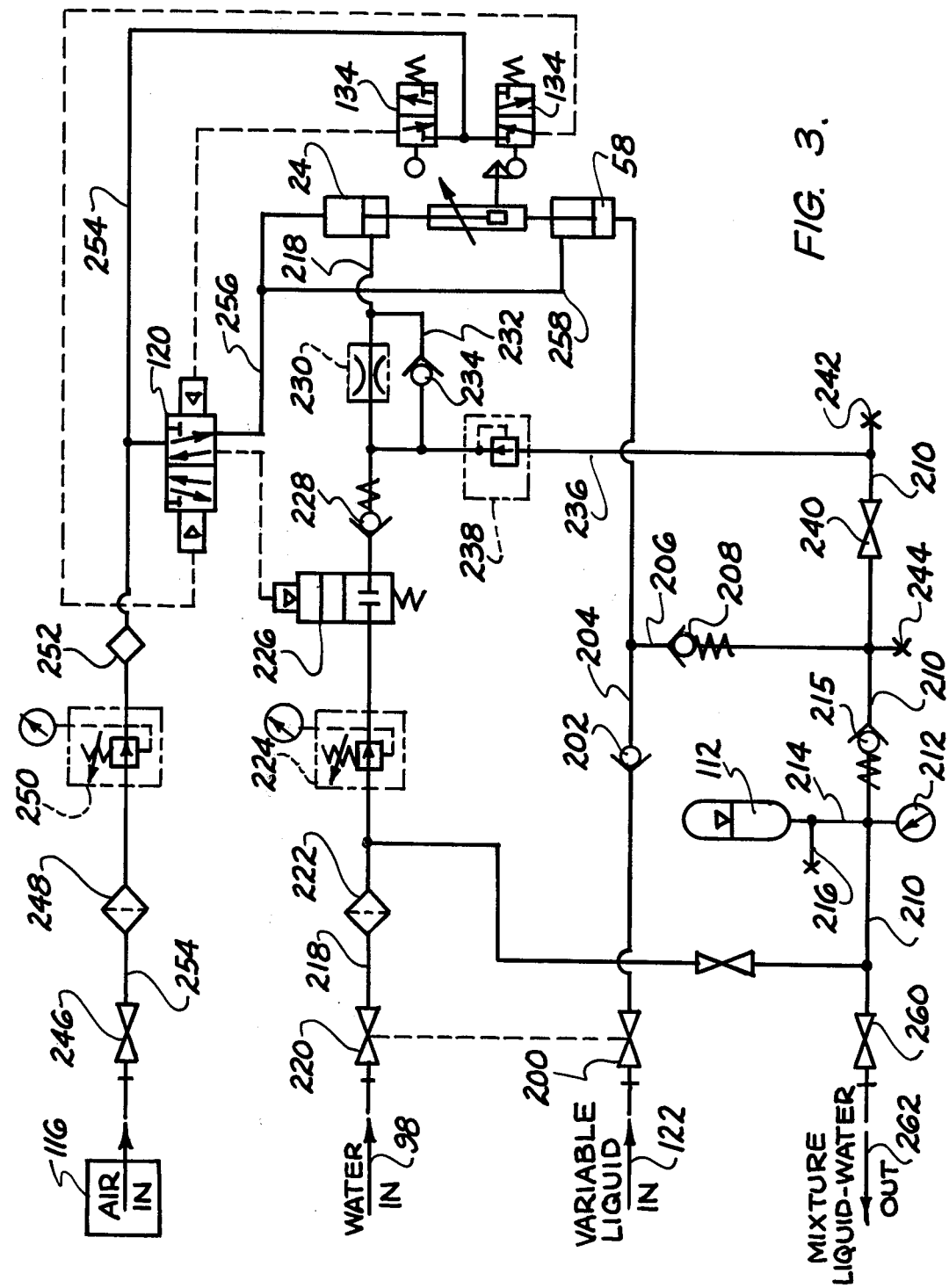

Further, the following detailed description of FIG. 3, will describe a full circuit arrangement adapted to the embodiment of FIG. 1 which clearly discloses to those skilled in the art the necessary operative principles involved.

It might be pointed out that the conventional double acting piston operates each piston in alternate sequence whereas the piston arrangement shown in FIG. 1 operates simultaneously. However, the results of delivering known volumes of the respective liquids with the ability of accurately controlling and varying the volume of the liquid delivered from chamber 182 remains the same.

Now referring to FIG. 3, a typical fluid circuit is diagrammatically illustrated with respect to the embodiment shown in FIG. 1.

Pistons 24 and 58 with their respective variable volume chambers are shown as connected to their respective liquid supply vessels. The incoming liquid, a graphite suspension for example, whose volume is desired to be varied according to a given application is communicated to chamber 76 through an on-off valve 200 and a check valve 202 by conduit 204. Typically the supply of the variable liquid is not specifically pressurized, except for the minimal pressure related to the height of the vessel used to store the liquid supply. It should be noted that upon charging chamber 48 with pressurized water, the movement of piston 24 also causes piston 58 to move to the left and draws liquid into chamber 76 through check valve 202 in line 204. Upon delivery from chamber 76, the outgoing liquid via line 204 is directed to line 206 as it cannot pass check valve 220. Line 206 includes a direction check valve 208 to permit only the high pressurized outcoming volume of liquid to enter rather than lower pressure supply liquid.

Conduit 210 communicates the pressurized volume of liquid in line 208 to accumulator 112 via line 214. A pressure gage 212 is provided and indicates a desired level of pressure in which the system will be in equilibrium as dictated by pressure check valve 215. A prefill plug 216 is provided to permit an initial charge of the desired mixture for priming accumulator 112.

The constant volume liquid, delivered from chamber 48, for example water, to dilute the graphite suspension, may be connected to a conventional tap source 98 via line 218 which includes an on-off valve 220, a filter 222, a pressure regulator 224, control valve 226, pressure check valve 228, and a flow controller 230.

The outlet water from chamber 48 is delivered via line 218 and line 232 carrying check valve 234 to conduit 236 which is connected to a pressure control valve 238 and to line 210 which in turn communicates with accumulator 112 as previously described. An on-off valve 240 is provided with a tee outlet 242 for test purposes similarly to test tee 233 to permit checking or trouble-shooting the system.

A source of pressurized air 116, preferably at about 80 psi, is introduced to air chambers 42 and 72 through on-off valve 246, filter 248, pressure regulator 250 and another filter 252 all provided in incoming air lines 254 which is connected to pneumatic limit valves 134 and to a double pilot actuated control valve 120.

Pressurized air is supplied to each driving cylinder through control valve 120 via lines 256 and 258.

Control valve 120 also is connected to water valve 226 which upon appropriate command opens from its normally closed position to permit incoming water, preferably between approximately 15 to 40 psi, to fill cylinder 24 after a power stroke to return the pistons to their original positions.

As previously mentioned, the pressurized fill of water into chamber 48 which repositions piston 24 also draws piston 58 back to its original position as set by adjustment means 56 which then draws the pre-set complement of liquid from variable liquid supply 122 into chamber 76.

An on-off valve 260 is provided in an outlet 262 in line 210 to permit the predetermined mixture stored in accumulator 112 to be drawn for use. When the accumulator reaches the desired level of charge which is equal to the driving pressure of the air on the pistons, the system will be in equilibrium and the pistons will not fire.

Upon opening discharge valve 260 and as the pressure in accumulator lowers to a value in which the line pressure is greater than the pre-set pressure check valve 215, the system is automatically actuated to recharge the accumulator until the equilibrium pressure is again reached on both sides of check valve 215.

From the foregoing description, it should be readily appreciated that the present invention provides a dual liquid proportioning apparatus which is relatively simple to manufacture and maintain and very accurately delivers a mixture of the two liquids in very precise ratios which may be easily varied according to the requirements of the specific application.

This apparatus has been found to handle an abrasive mixture such as graphite and water with none of the adverse effects which such mixtures have on conventional apparatus and yet reliably delivers the desired mixture in a repetitive and precise manner.

Further, the pressurized storage of the mixture in an accumulator or the like is highly convenient to the end user as a hose or spray nozzle may be used to apply the mixture for its intended use. Upon use, the system automatically recharges the accumulator without the need for constant manual supervision.

Of course other liquids which require similar handling and which are used in proportions which require change may be used to advantage in the present invention.

What is claimed is:

1. In a dual liquid proportioning and dispensing apparatus the combination of a first liquid source communicated to a first variable volume chamber means provided with flexible walls and port means; a second liquid source communicated to a second variable volume chamber means provided with flexible walls and port means; a piston and cylinder means operatively connected to each of said chamber means to collapse a respective one of said chamber means upon a respective power stroke to deliver liquid from a respective one of said chamber port means; a source of driving pressure operatively connected to each one of said piston and cylinder means to drive said pistons; piston stroke adjustment means mounted on at least one of said piston and cylinder means and operative to vary the effective stroke of said piston relative to the force applied to the associated variable volume chamber means and the volume of liquid dispensed therefrom upon a power stroke, said piston stroke adjustment means includes a frame means mounted in sliding relationship with the piston rod of said piston and cylinder means and including sleeve means slidably mounted in releasably locked relationship along a given length of said frame for contact with said piston rod to vary the effective stroke length of said rod relative to the fixed position of said sleeve means on said frame; a common liquid collecting tank communicated to the output liquid delivered from each of said chambers; and fluid control means operatively communicating with each of said piston and cylinder means, to each of said variable volume chambers and to said collecting tank to provide automatic operation of said apparatus for actuating said piston and cylinders to charge said collecting tank upon predetermined pressure signals.

2. The apparatus defined in claim 1 wherein each of said piston and cylinder means include opposing variable volume chambers connected in force transmitting and sealed relationship therewith; one of said opposing variable volume chambers being the power chamber and communicated to said source of driving pressure and the other of said opposing variable chambers being the liquid chamber connected to a respective one of said liquid sources; and control means communicating with said driving pressure source to coordinate the power stroke of each piston for simultaneous activation.

3. The apparatus defined in claim 2 wherein one of said piston and cylinder means is always operatively effective through a full power stroke and the liquid chamber associated therewith is connected to a liquid source regulated at a predetermined pressure sufficient to return the piston to its starting position after a power stroke.

4. The apparatus defined in claim 3 wherein said frame means of said piston stroke adjustment means is rigidly connected to said operatively effective full stroke piston and slideably connected to the other of said pistons for a portion of said piston's stroke dependent upon the relative position of said sleeve means.

5. A dual liquid proportioning and dispensing apparatus comprising, in combination, a first piston and cylinder means; a second piston and cylinder means; opposing variable volume chambers disposed in force-transmitting and sealed engagement with a respective one of each of said piston and cylinder means, one of said opposing chambers associated with a respective one of said piston and cylinder means being a power chamber and communicated to a source of driving pressure to initiate a power stroke and the other of said opposing chambers being the liquid chamber connected to a respective one of different liquid sources to be dispensed; means connecting said first and second piston and cylinder means to one another to vary the effective stroke length of one of said piston and cylinder means relative to the other; control means communicating with said driving pressure source and with said chambers to coordinate the power stroke of each of said piston and cylinder means for simultaneous actuation.

6. The apparatus defined in claim 5 wherein one of the liquid sources is regulated at a predetermined pressure effective to actuate the return of both said first and second piston and cylinder means to their starting position prior to another power stroke.

* * * * *